United States Patent
Gilsdorf

(10) Patent No.: US 7,131,230 B1
(45) Date of Patent: Nov. 7, 2006

(54) BIRD DECOY

(76) Inventor: Richard L. Gilsdorf, 38256 WCR 19, Fort Collins, CO (US) 80524

( * ) Notice: Subject to any disclaimer, the term of this patent is extended or adjusted under 35 U.S.C. 154(b) by 0 days.

(21) Appl. No.: 11/005,682

(22) Filed: Dec. 7, 2004

(51) Int. Cl.
*A01M 31/06* (2006.01)
(52) U.S. Cl. .................................. 43/3; 43/2
(58) Field of Classification Search .............. 43/2, 43/3
See application file for complete search history.

(56) References Cited

U.S. PATENT DOCUMENTS

| | | | | |
|---|---|---|---|---|
| 1,083,882 A * | 1/1914 | Hindmarsh | | 43/3 |
| 1,629,442 A * | 5/1927 | Geisinger | | 43/3 |
| 3,435,550 A * | 4/1969 | Carlson | | 43/3 |
| 3,736,688 A * | 6/1973 | Caccamo | | 43/3 |
| 4,620,385 A * | 11/1986 | Carranza et al. | | 43/3 |
| 4,827,389 A * | 5/1989 | Crum | | 362/388 |
| 5,003,722 A * | 4/1991 | Berkley et al. | | 43/3 |
| 5,144,764 A * | 9/1992 | Peterson | | 43/3 |
| 6,092,323 A * | 7/2000 | McBride et al. | | 43/3 |
| 6,216,382 B1 * | 4/2001 | Lindaman | | 43/2 |
| 6,349,902 B1 * | 2/2002 | Cripe | | 244/153 R |
| 6,360,474 B1 * | 3/2002 | Wurlitzer | | 43/3 |
| 6,449,894 B1 * | 9/2002 | Price et al. | | 43/3 |
| 6,484,431 B1 * | 11/2002 | Price et al. | | 43/3 |
| 6,574,904 B1 * | 6/2003 | Fencel et al. | | 43/3 |
| 6,640,483 B1 * | 11/2003 | Nelson | | 43/3 |
| 6,793,367 B1 * | 9/2004 | Chan | | 362/190 |
| 6,930,239 B1 * | 8/2005 | Chen | | 174/7 |
| 2003/0182840 A1 * | 10/2003 | Colley | | 43/3 |
| 2003/0208944 A1 * | 11/2003 | Olson et al. | | 43/3 |
| 2005/0252066 A1 * | 11/2005 | Couvillion, III | | 43/3 |

* cited by examiner

*Primary Examiner*—Teri Pham Luu
*Assistant Examiner*—Joshua Michener
(74) *Attorney, Agent, or Firm*—Marian J. Furst

(57) ABSTRACT

Game bird decoy having movable wings that exhibit a lifelike simulation of a game bird in flight. The invention also comprises a kit that can be assembled to form a game bird decoy and a method for using the kit and decoy.

22 Claims, 8 Drawing Sheets

BIRD DECOY

FIELD OF THE INVENTION

The present invention relates generally to a hunting bird decoy, and more particularly to a hunting decoy for geese and ducks.

BACKGROUND OF THE INVENTION

Game birds, such as geese and ducks, have been hunted for centuries. These species of birds are both migratory and gregarious, generally traveling in flocks. It appears that they find safety in large groups, much as many types of fish find safety by swimming in schools. Further, they follow each other in flight, benefitting from the draft created by the bird or birds in front of them. The birds migrate south in fall, at a time that coincides with the hunting season.

Hunters often use decoys, or artificial objects shaped and colored to resemble birds, to attract groups of flying birds. Most decoys are designed to resemble birds on the ground or on a body of water, and they are set either on the ground or float on a body of water. However, by either natural selection or learning through experience, many geese and ducks now are wary of conventional hunting decoys. If flying geese or ducks spot something on the ground that looks like another goose or duck, the flock will generally circle around the object on the ground, maintaining a distance that is sufficient to prevent a nearby hunter from presenting a threat. In other words, these birds appear to have "learned" that a bird sitting on the ground is associated with gunshots directed toward the flock.

Motorized decoys that simulate flying birds have been developed. However, these motorized decoys are expensive. Further, the use of motorized decoys is disfavored by many hunters and environmentalists, and efforts are under way to make the use of motorized decoys illegal in the United States.

Thus, there is a need for a relatively inexpensive, non-motorized decoy that simulates birds in flight and that will attract even decoy-wary geese and ducks as they migrate.

SUMMARY OF THE INVENTION

To achieve the foregoing and other objects and in accordance with the purpose of the present invention broadly described herein, one embodiment of this invention comprises a game bird decoy. The decoy comprises an upright member including a rod, a body mounting extension at an end of the rod, and a tubing sleeve fixed to the rod adjacent the body mounting extension and substantially perpendicular to the long dimension of the rod. The decoy also comprises a crossbar approximately centered in the tubing sleeve of the upright member and approximately perpendicular to the upright member. The crossbar has a length selected to approximate the length of a game bird's wing span and an outer circumference small enough to provide play between the crossbar and the tubing sleeve. In addition, the decoy comprises a pair of wings mounted onto and secured onto the crossbar, with one wing on either side of the upright member. Each wing has a shape selected such that the wing and crossbar can move in a manner that simulates the flapping of a game bird's wings during flight. The decoy includes a bird body, mounted onto the body mounting extension of the upright member, and means for positioning and retaining the upright member at a selected ground location with a selected orientation.

Preferably, the means for positioning and retaining comprises a sleeve insert at a second end of the upright member, with the sleeve insert inserted into a ground sleeve having an inner opening. In this case, the inner opening of the ground sleeve and the ground sleeve insert on the upright member are shaped such that the decoy can be maintained in an orientation facing into a wind. More preferably, the ground sleeve is adapted for insertion into the ground. Also preferably, each wing is formed from a material having sufficient flexibility to allow it to flap in the wind in a manner that simulates a bird's wing in flight and sufficient durability to withstand long-term use outdoors. Each of the wings may comprise a sleeve extending along one edge and into which one end of the crossbar is inserted. The bird body may be sized, shaped, and marked to resemble the body of a predetermined species of bird when viewed from the top. Preferably, the game bird is selected from ducks and geese.

Either the crossbar, the upright member, or both may have spring-like properties sufficient to allow flexing and unflexing motions in the presence of wind that simulate a bird's wing motion. Preferably, the wing, the crossbar, and the upright member are adapted for motion that simulates flight of a game bird in winds with velocities greater than about 3 miles per hour. It is desirable that the rod of the upright member has a length sufficient to support the wings and the crossbar far enough above the ground to allow for life-like wing motion.

Another embodiment of the present invention comprises a kit for a game bird decoy. The kit comprises an upright member including a rod, a body mounting extension at an end of the rod, and a tubing sleeve fixed to the rod adjacent the body mounting extension. The kit also includes a flexible crossbar positioned within the tubing sleeve of the upright member and approximately perpendicular to the upright member. The crossbar has a length selected to approximate the length of a game bird's wing span and a circumference that allows the crossbar to slide easily through the tubing sleeve with some play. The kit also comprises a pair of wings that are mountable onto the crossbar. Each wing has a shape selected such that, when the kit is assembled, the wing and crossbar can move in a manner that simulates the flapping of the game bird's wings during flight. The kit additionally comprises means for attaching the wings to the crossbar and/or the upright member, a bird body adapted for mounting onto the body mounting extension of the upright member, and means for positioning and retaining the upright member at a selected ground location with a selected orientation.

The means for positioning and retaining may comprise a ground sleeve having an inner opening and a ground sleeve insert at a second end of the rod, wherein the sleeve insert and the ground sleeve are shaped and sized such that the upright member can be maintained in a predetermined orientation when the sleeve insert is positioned at a desired location on the ground and said sleeve insert is inserted into said ground sleeve. The ground sleeve may be adapted for insertion into the ground. In addition, the kit may comprise a driver for driving the ground sleeve into the ground, with the driver comprising a driving insert shaped and sized to fit removably inside an end of the ground sleeve and a driving surface attached to the driving insert.

Yet another embodiment of the present invention comprises a wing assembly for a game bird decoy. The wing assembly comprises a wing formed from a sheet of material shaped for substantially lifelike simulation of wing motion during flight. The wing may have colors and markings resembling the colors and markings of a game bird's wings.

Preferably, the game bird is selected from geese and ducks, and, more preferably, it is selected from Canada geese and snow geese. The wing assembly may additionally a crossbar onto which a pair of wings are mounted. The wing assembly may have dimensions substantially as shown in FIG. 4.

BRIEF DESCRIPTION OF THE DRAWINGS

These and other features, aspects, and advantages of the present invention will become better understood with reference to the following description, appended claims, and accompanying drawings, where:

DESCRIPTION OF THE INVENTION

The present invention comprises a game bird decoy suitable for attracting gregarious flying game birds. The decoy is suitable for use by hunters to attract species that migrate in flocks and tend to follow other birds of the same species, and particularly suitable for attracting geese and ducks. However, the decoy could be used with other birds that exhibit the type of flight behavior seen with geese and ducks, and it could be used for other purposes, such as for attracting birds for observation, wildlife management, or disease monitoring purposes.

In reading and understanding the following description, it should be realized that migratory water fowl, such as geese and ducks, have protective eyelids that cover their eyes while diving in water and during flight. Although these eyelids are somewhat transparent, they blur the vision of the birds. Further, most species of birds have eyes that are mounted on the sides of their heads, so the animals do not have stereo vision. Thus, the present invention is based on the realization that a decoy should resemble a bird of a target species with a motion that approximates the motion of a flying bird of the target species, but it need not replicate exactly the wing motion of the target species.

Figures 1, 2:
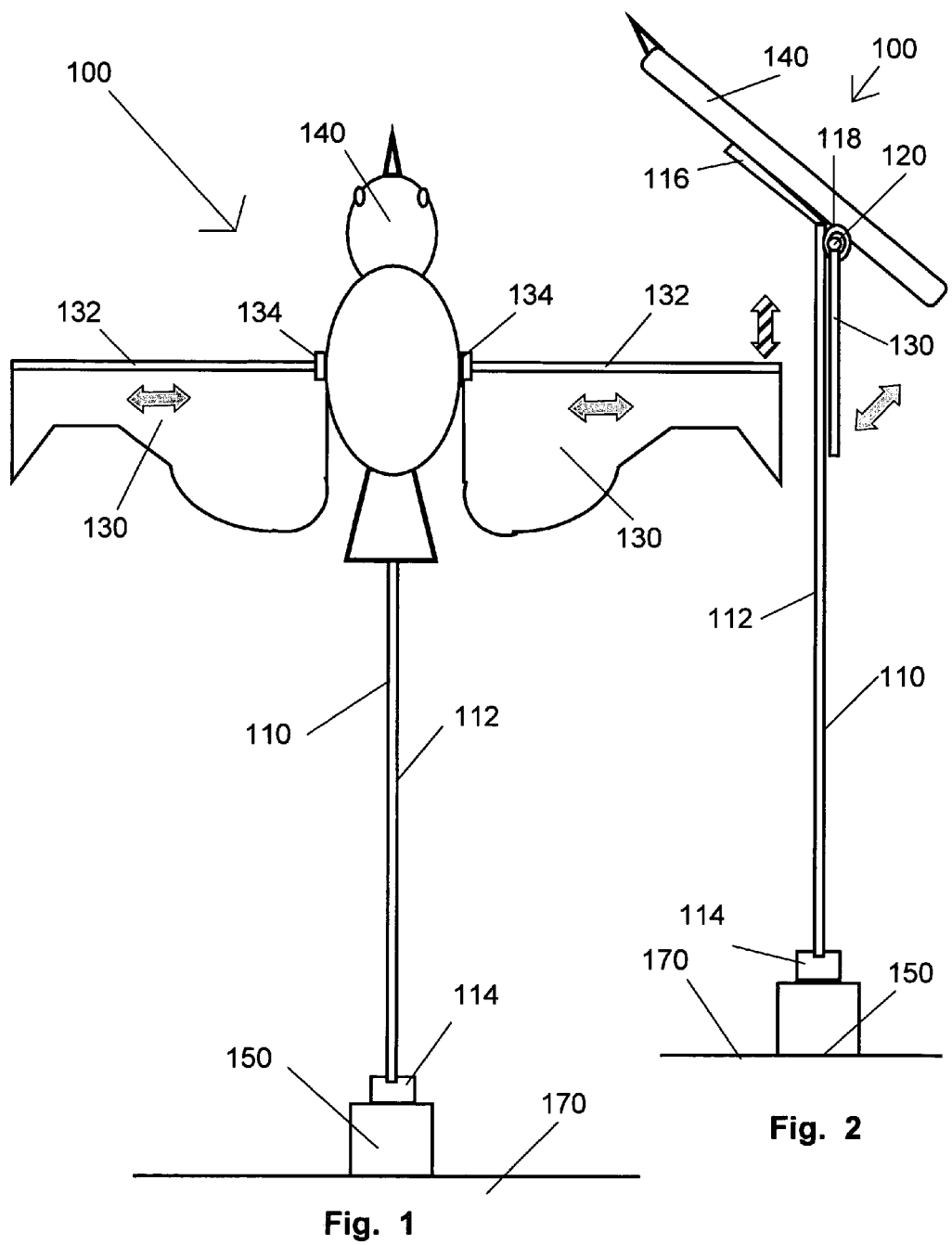
FIG. 1 is a rear view of one embodiment of a decoy in accordance with the present invention.
FIG. 2 is a side view of the embodiment of FIG. 1.
Figure 3:
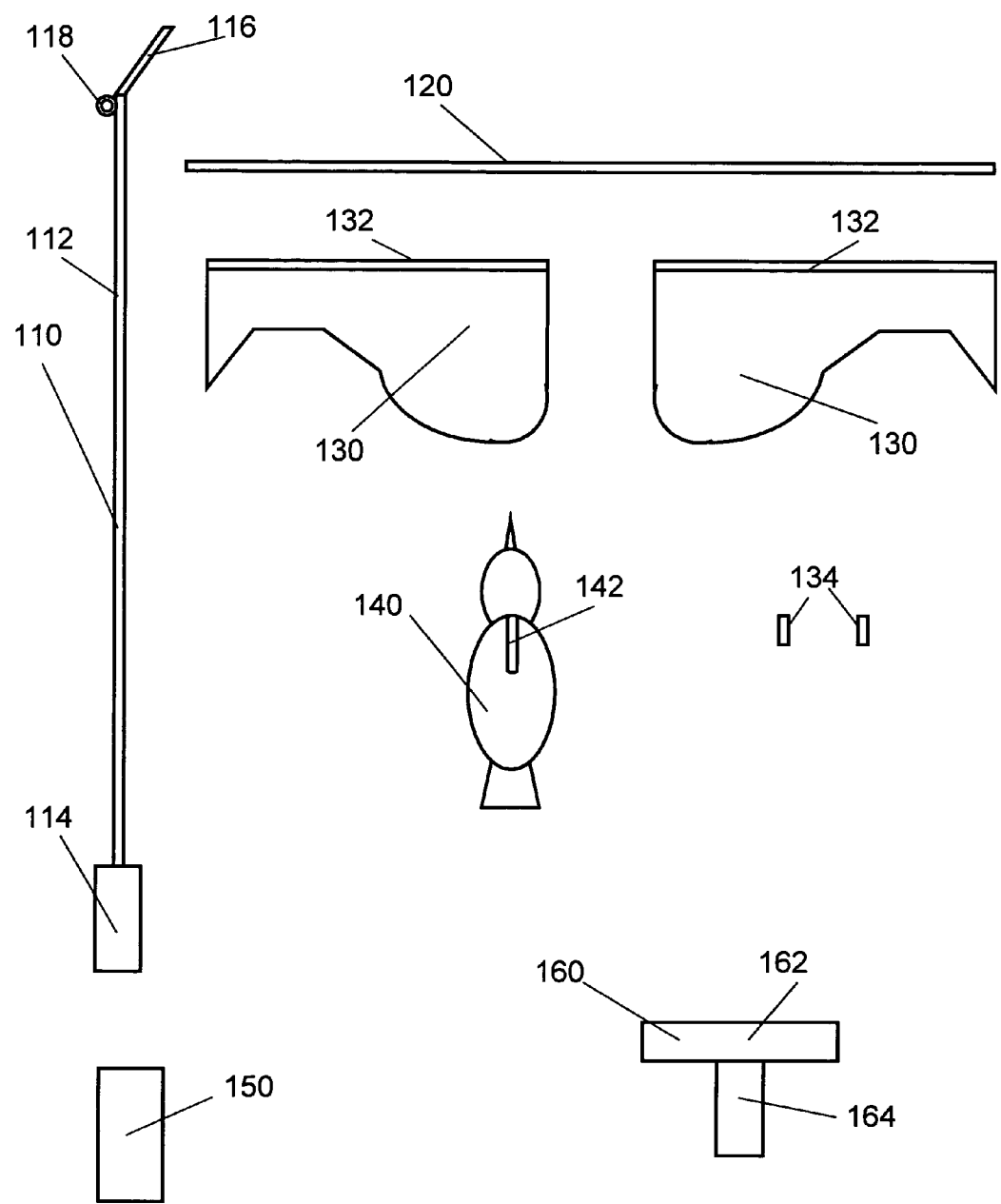
FIG. 3 shows the components of a kit than can be assembled to form the decoy of FIG. 1.

Referring to FIGS. 1–3, a decoy 100 in accordance with the present invention comprises an upright member 110, a crossbar 120, a pair of wings 130 mounted to the crossbar, a bird body 140 mounted to the upright member 110, and a ground sleeve 150 that is partially inserted into the ground 170. The arrows in FIGS. 1 and 2 show a simplified rendering of the motion of the crossbar 120 and the wings 130, which exhibit a complex flapping motion when exposed to wind, with the crossbar moving reciprocally up and down as well as sideways while the wing ripples and waves. The hatched arrow indicates the motion of the crossbar, and the stippled arrows indicate the wave-like motion of the wing.

Upright member 110 comprises a rod 112, with a sleeve insert 114 rigidly attached to the lower end of rod 112 and a body mounting extension 116 rigidly attached to the other end of the rod 112. Preferably, rod 112 is sufficiently flexible and springy to allow the decoy 100 to move in a manner that simulates the motion of a flying bird, as discussed below. However, rod 112 should be stiff enough that it supports the crossbar 120, wings 130, and bird body 140 in the air, even in the presence of a strong wind, but it should be resistant to fatigue from motion in extended use. A suitable material is a rod of ⅜ inch-diameter cold rolled 1018 steel, which has a "memory" and will spring back to its initial position after it is flexed. Other materials known in the art that have similar properties could be used. Examples of such materials include metals, other alloys, and fiberglass. Ground sleeve insert 114 aids in supporting the decoy and maintaining its orientation during use.

A tubing sleeve 118 is fixed to rod 112 just below the body mounting extension 116, oriented substantially perpendicular to the long dimension of the rod 112. Tubing sleeve 118 is a hollow sleeve with an inner diameter sized such that crossbar 120 can slide easily through the hollow. The wall thickness should be adequate to maintain the rigidity of the tubing sleeve 118 and to provide support for the crossbar 120. One suitable material for the tubing sleeve is seamless stainless steel pipe for carrying water or high pressure fluids, having a ¼ inch outer diameter and a 0.049 inch wall thickness. As shown, tubing sleeve 118 is in the form of a hollow cylinder, but it could have another cross sectional shape, such as a hollow polygon.

Crossbar 120 is positioned within tubing sleeve 118 such that it is centered about rod 112. It should have a length that approximates the wing span of the type of game bird that is to be attracted with the decoy, and it also should have sufficient flexibility and springiness to provide for a good simulation of a bird's wing motion. The crossbar 120 should have a cross sectional profile perpendicular to the long dimension such that it can slide easily into and through tubing sleeve 118 on upright member 110, with some play between the crossbar and the tubing sleeve. As shown, the cross section is round and fits into cylindrical tubing sleeve 118. However, other shapes could be used, as long as the crossbar slides easily through the tubing sleeve. One suitable material for the crossbar is ⅛ inch diameter cold rolled 1018 steel rod, which has a "memory" and will spring back to its initial position after it is flexed and is resistant to fatigue from motion during extended use. Alternatively, other materials known in the art that have similar properties could be used, such as metals, other alloys, or fiberglass.

It is also important that there is some play between the crossbar and the inside of tubing sleeve, allowing the motions of the two sides of the crossbar to be linked so as to resemble the motion of paired wings. The use of a tubing sleeve having a ⅜ inch outer diameter and a wall thickness of 0.049 inches in combination with a crossbar having a ¼-inch diameter allows for sufficient play in the crossbar motion.

Wings 130 are shaped such that, when mounted onto the two sides of crossbar 120, centered about rod 112 and subjected to even a slight breeze, the wings 130 and the crossbar 120 flap in a motion that simulates the wing motion of flapping wings of the desired type of bird. Any material may be used for the wings that has suitable flexibility to create the desired flapping motion and sufficient durability for use in windy environments. One satisfactory material is 200 denier nylon. The wings 130 may be mounted to the crossbar 120 in any manner that allows them to remain extended along the crossbar and not wrinkle, and that also retains them on the crossbar. One simple mounting means includes a pocket 132 along the top edge of the wing 130.

The pocket may be formed by folding the straight edge of the fabric over and then joining the two layers of fabric together by stitching, gluing, heat sealing, or any other method known in the art. The pocket 132 should be sized such that one end of crossbar 120 may be inserted into it. Each wing 130 should be secured to crossbar 120, such as with a clip 134, which could be any clip known in the art, including a binder clip or a clothes pin. Alternatively, the inside edge of pocket 132 could be hooked to the crossbar 120 or to rod 112. Preferably, the wing 130 extends from a point close to the center of the crossbar 120 to the end of the crossbar.

Figure 4:
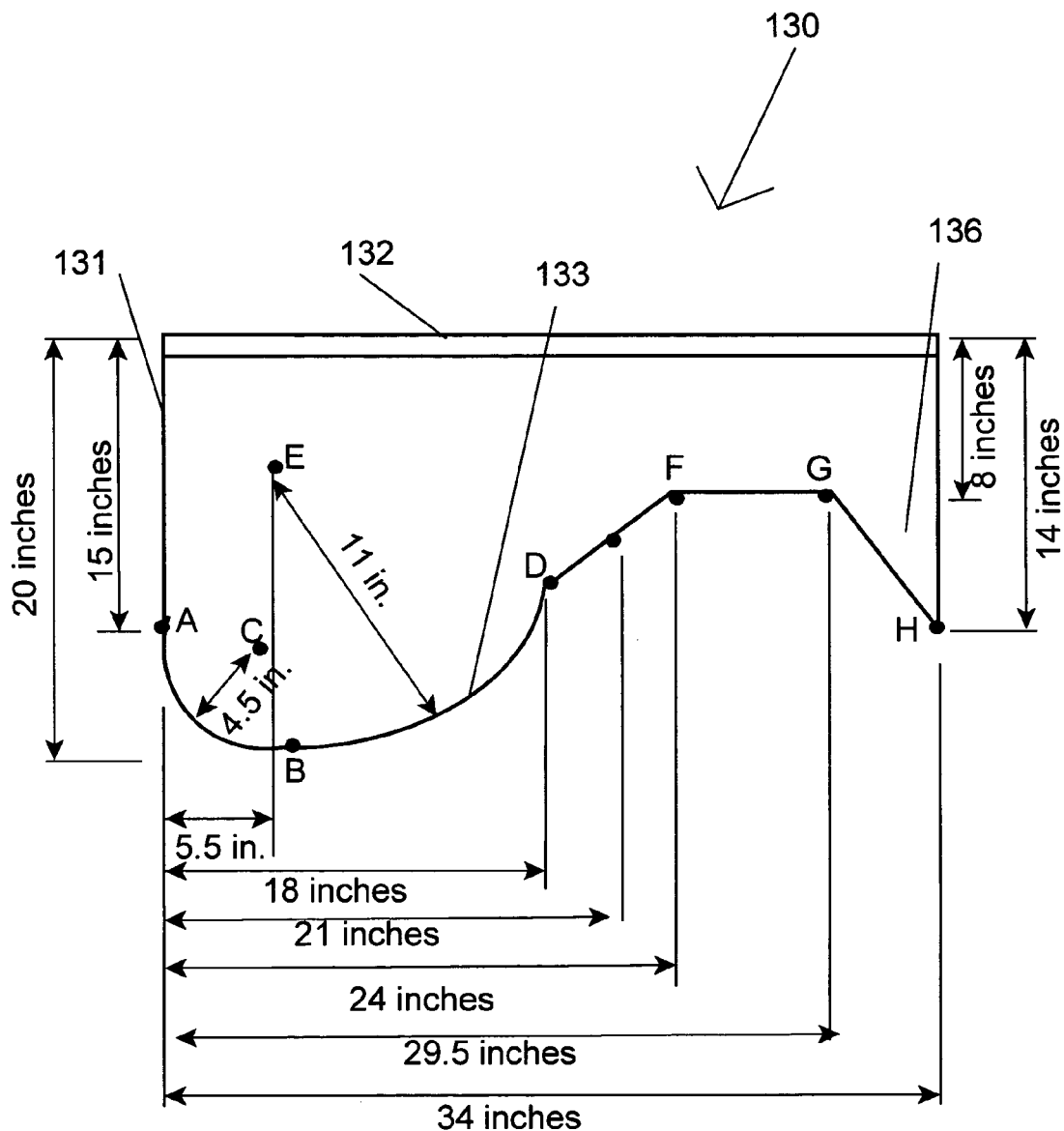
FIG. 4 is a detailed plan view of one embodiment of a wing for a decoy in accordance with the present invention.

It has been found that the shapes and dimensions of the wings as well as the springiness of the crossbar are critical in providing the desired wing motion, particularly in low-wind situations. For example, FIG. 4 illustrates a wing 130 shaped and dimensioned to provide a simulation of the flying wing motion of Canada and snow geese that is attractive to flocks of flying geese with wind speeds as low as three miles per hour. Pointed wing tip 136 aids in imparting a life-like motion to the rest of the wing by initiating wing motion in even a slight breeze. Wing tip 136 travels in a wave-like flapping manner up and down, creating waves that travel reciprocally between the edge 133 of the wing and the crossbar, between the ends of the wings and the rod 112, and also between the two wings. The width of the wing from front to back is also selected to provide a fluttering motion that can be initiated with a slight breeze and that also provides a suitably close simulation of the natural wing motion of a flying bird, such that a bird will be deceived into thinking the decoy is a live bird.

Figure 12:
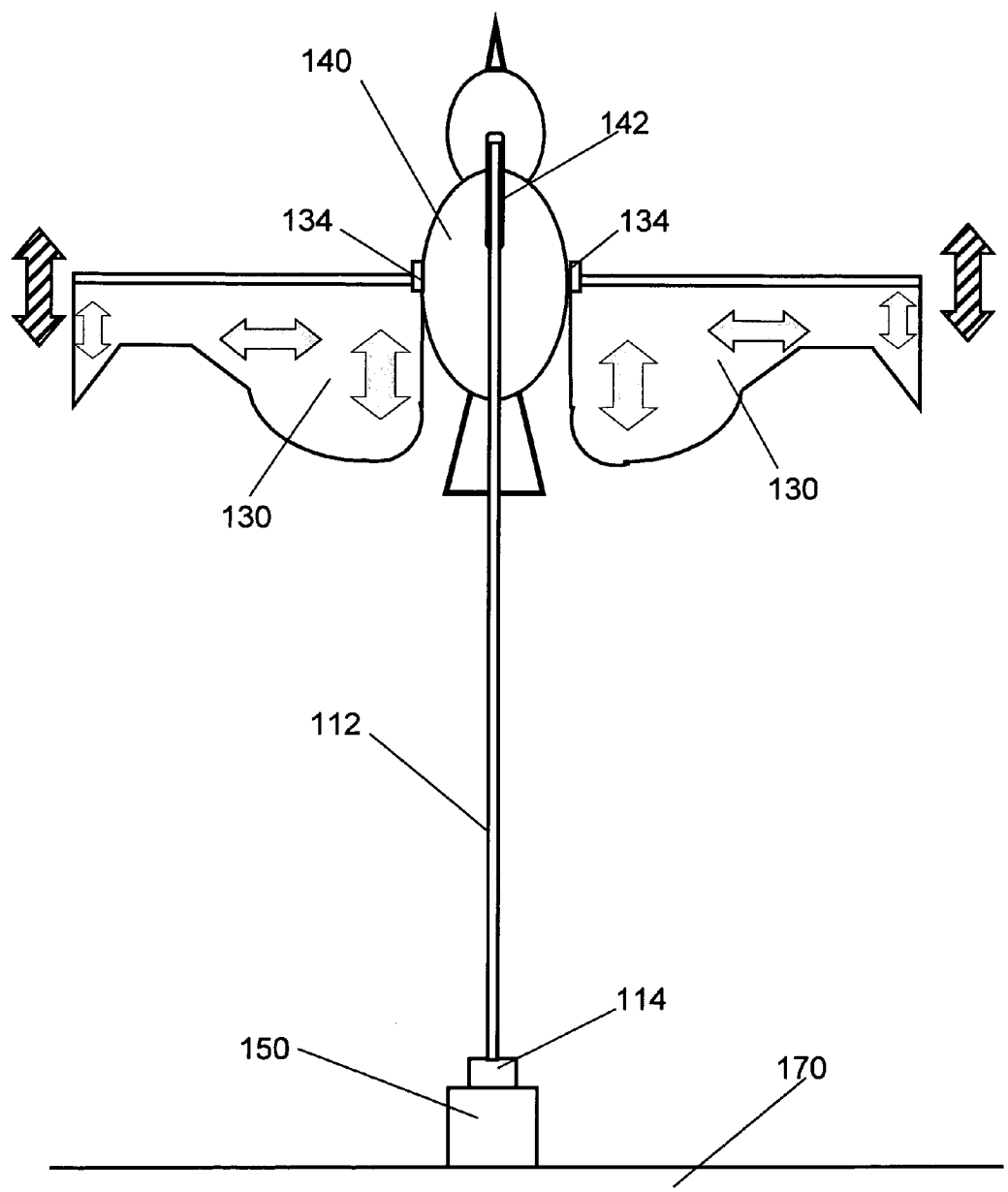
FIG. 12 is a front view of the decoy of FIG. 1.

Referring to FIG. 12, the length of the pocket 132 from the interior edge 131 adjacent the upright member to the wing tip 136 is selected to simulate the wing span of the desired target bird species, or 34 inches. Interior edge 131 is straight between pocket 132 and a point A, located 15 inches toward the trailing edge 133 of wing 130. From point A to point B, trailing edge 133 forms an arc having a radius of 4.5 inches centered at point C. Between point B and point D, trailing edge 133 forms an arc having a radius of 11 inches, centered at point E. Point D is 18 inches from edge 131. Edge 133 has a straight section between points D and F that is disposed at an angle with respect to pocket 132 and is parallel to pocket 132 between points F and G. Wing tip 136 terminates at point H.

Figure 9:
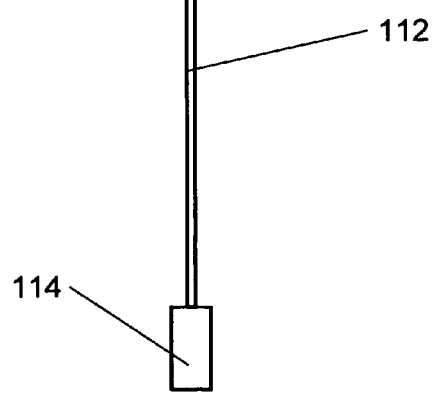
Figure 10:
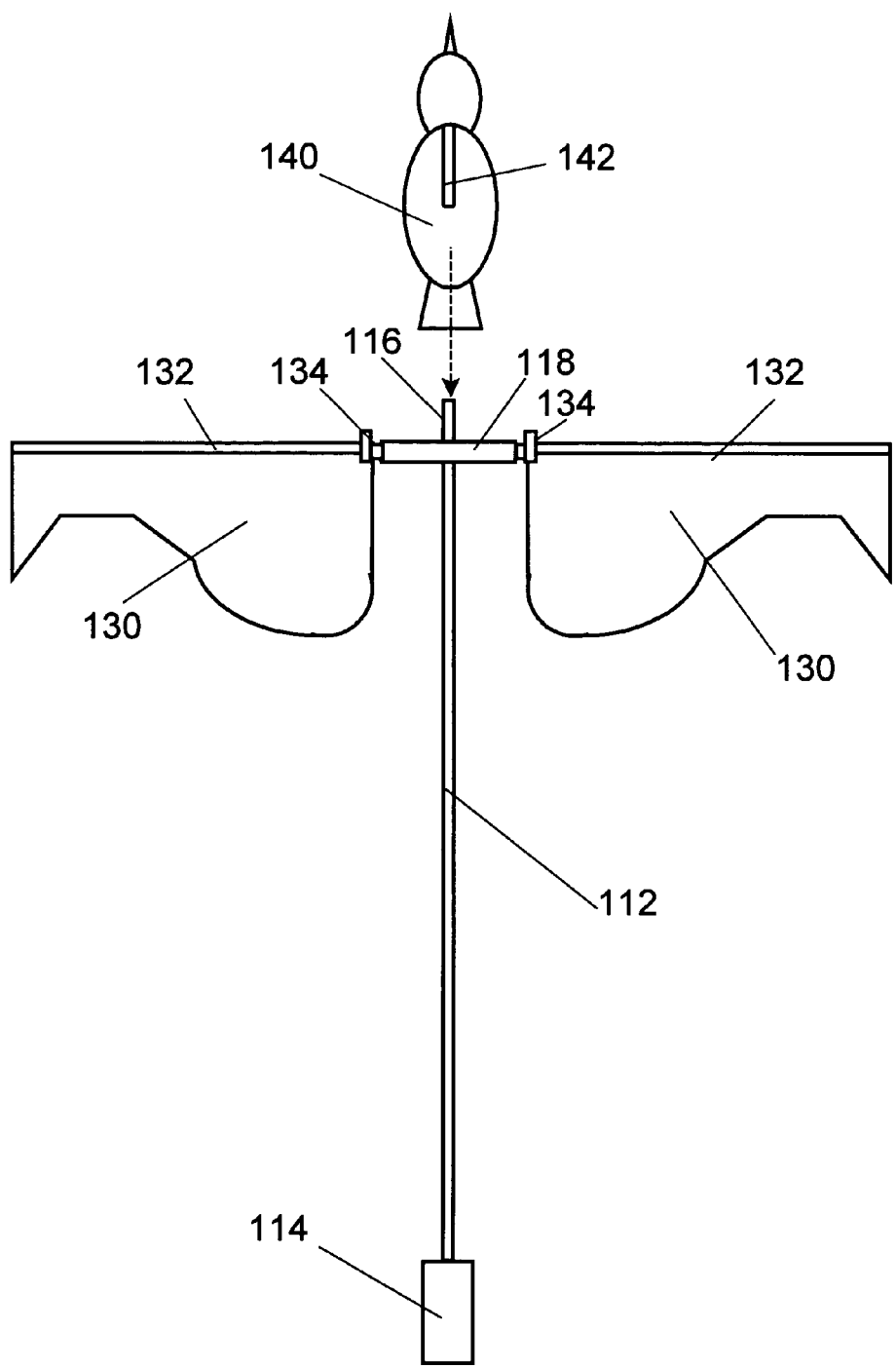
Figure 11:
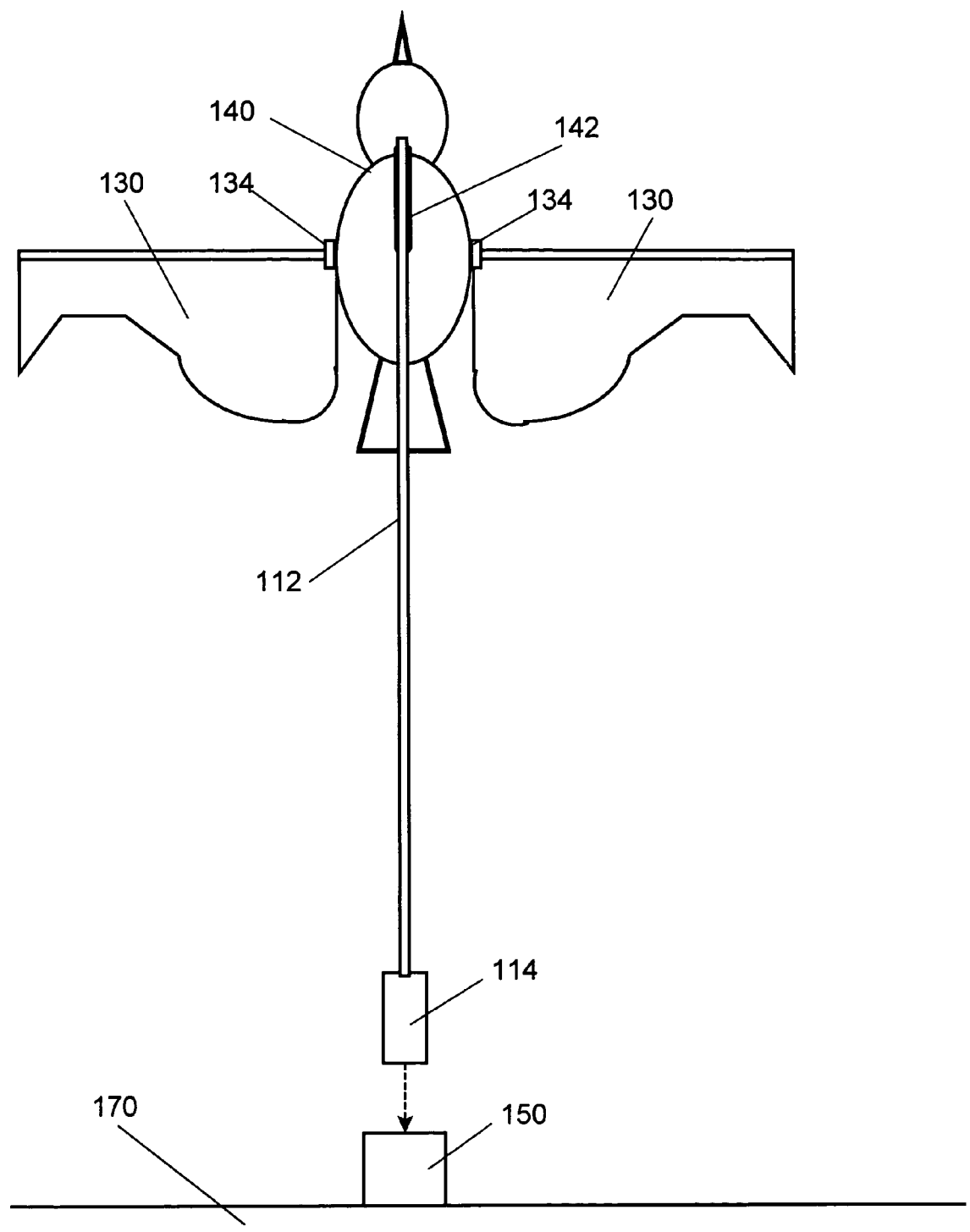

A bird body 140 is sized and shaped to resemble the back of a bird of the target species, and it is preferably decorated with markings in the appropriate colors to further simulate a bird of the target species. The underside of bird body 140 is adapted for mounting onto the body mounting extension of the upright member. One suitable means for mounting the body 140 is shown in FIGS. 9–11 as channel 142, which is sized to slide onto body mounting extension 116. The sides of body 140 make contact with crossbar 120, thus preventing body 140 from rotating about mounting extension 116. However, other ways of mounting a body to body mounting extension 116, known in the art, are within the scope of this invention. For example, the body could be permanently secured to the upright rod, or it could be secured with straps, clips, etc. The body should be large enough to cover the portion of the crossbar between the interior edges of the two wings of an assembled decoy, so that from a bird's eye view above the decoy, the crossbar is not visible. It should be noted that body 140 may be relatively flat, so long as it has an appearance similar to that of a game bird's body when viewed from its back.

Ground sleeve 150 supports the decoy while it is in use. As shown in FIGS. 1, 2, 7, and 11, ground sleeve 150 may be inserted into the ground at a desired hunting location. In this regard, it may be desirable to provide a pointed end (not shown) on the ground sleeve to facilitate its insertion into the ground. Ground sleeve 150 should have an interior opening with a shape that has corners, such that a ground sleeve insert 114 on upright member 110 can slide into ground sleeve 150 yet be prevented from rotating inside the sleeve, such as when wind hits the decoy. The ground sleeve 150 and the ground sleeve insert 114 should be sized such that the insert 114 slides easily into and out of the ground sleeve 150, but insert 114 should fit tightly enough inside the ground sleeve that the upright and decoy are retained in a desired orientation relative to the environment and the wind. It has been found that a metal ground sleeve having a 0.75-inch square profile and a 0.065-inch wall thickness works well with a ground sleeve insert having a 0.5-inch square profile. Ground sleeve 150 should be long enough to provide a secure anchor for the decoy, and the necessary length of the sleeve may vary according to the type of soil. For example, a longer sleeve may be needed if the soil is very sandy or loose.

Figure 6:
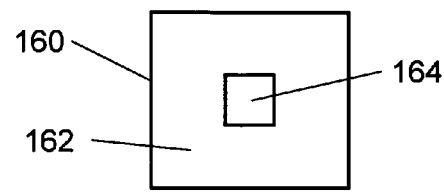
FIG. 6 is a bottom view the driver for the decoy ground sleeve of FIG. 1.
Figure 7:
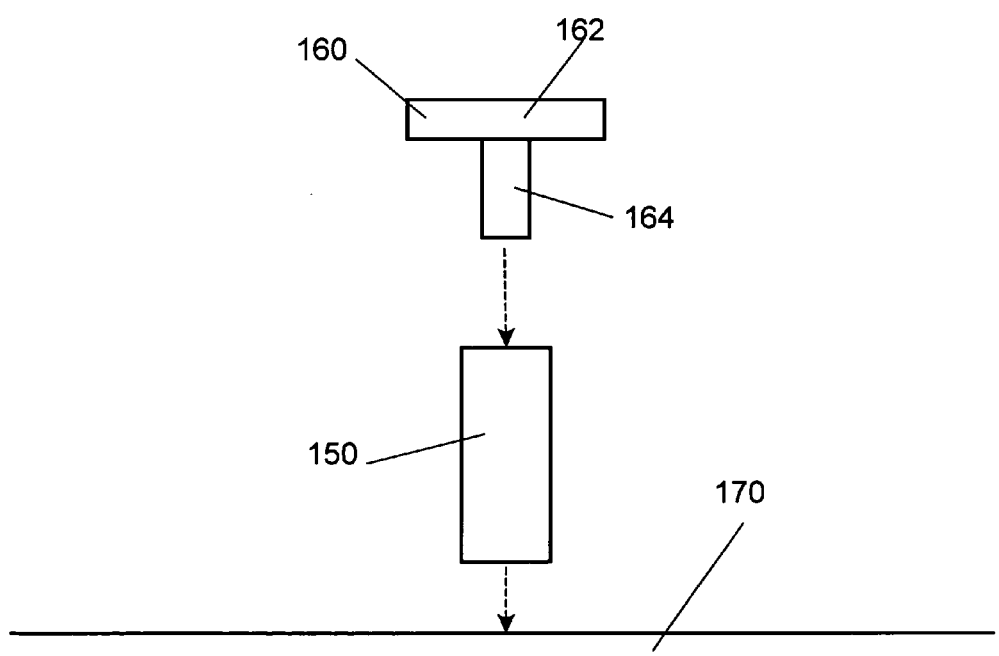
FIGS. 7–11 are side views showing a method of assembling the decoy of FIG. 1.

A driver 160 for use in installing decoy 100 at a desired location, is shown in FIGS. 3, 6, and 7. Driver 160 comprises a plate 162 to which an extension 164 is secured. Extension 164 should fit within the opening in ground sleeve 150 and can be formed from the same stock material that is used for ground sleeve insert 114.

Although a ground sleeve that is inserted into the ground is a simple and convenient means for anchoring the decoy in most types of soil, other anchoring configurations are contemplated as falling within the scope of the invention. For example, the ground sleeve could be attached to a larger diameter, heavy base that sits upon the ground or is anchored to the ground with pegs, stakes, or weights. Alternatively, the upright member could be inserted directly into the ground.

A decoy in accordance with the present invention can be made by cutting the parts from suitable stock materials. The rod, tubing sleeve, ground sleeve insert, and ground sleeve can be cut from lengths of appropriate stock. The tubing sleeve and the ground sleeve insert are welded or otherwise joined onto the rod to form an upright member. The end of the upright member distal from the ground sleeve insert may bent, such as with a jig, adjacent the tubing sleeve to form a body mounting extension. Two wings may be cut from an appropriate fabric. A pocket may be formed along the long straight edge by folding the fabric over and stitching or heat sealing the edge to the main part of the wing. Although 200 denier nylon has held up well during use outdoors without further treatment, it may be desirable to heat treat the edges to prevent fraying.

The bird body may be formed from any suitable material by any molding or forming process known in the art, including injection molding and pressure forming. Preferably, it is pressure formed from a sheet of plastic for reasons of economy. The top of the body may be painted or otherwise marked to resemble the back of a bird of the desired species. For example, a Canada goose decoy might be painted with white tail and cheek patches.

In use, an appropriate location is selected for the decoy. Preferably the location is downwind from any conventional, ground set decoys that might be in use and sufficiently far away from the ground set stationary decoys that flying birds will be attracted to the decoy of the present invention. The location should be upwind from the position the hunter intends to take during hunting, far enough from the hunter's position to prevent the approaching game birds from seeing the hunter but close enough to allow the hunter to aim at and shoot down birds. It has been found that a distance of 60 to 75 yards is sufficient in most cases. With stronger wind, the distance may be decreased somewhat.

Figure 5:
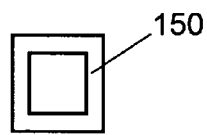
FIG. 5 is a top view of a ground sleeve of the decoy of FIG. 1.

It should be noted that it might be possible under some circumstances to insert the end of an upright member directly into the ground, without the use of a ground sleeve, such as ground sleeve 150, and without the use of a ground sleeve insert, such as insert 114. However, the best simulation of a bird's wing motion occurs when the decoy faces into the wind, and, therefore, it is important to prevent the decoy from rotating about the upright member while in use and exposed to wind. Thus, it is desirable to use a ground sleeve, to anchor the upright member 110 and maintain it in a desired orientation with respect to the wind. Thus, the ground sleeve 150 is inserted into the ground, as shown in FIG. 7, in a manner that will accommodate the rest of the bird decoy in an up-wind facing direction. If the ground sleeve 150 has a square cross section as shown in FIG. 5, one side of the square should face upwind.

It may be necessary to use a hammer or mallet to drive the ground sleeve 150 into the ground. To prevent damage to the top of the ground sleeve 150, it may be desirable to use a driver, such as driver 160, shown in FIGS. 3, 6, and 7. Such a driver can be made by welding an extension 164 comprising a short length of the same stock used for the ground sleeve insert on the upright member of the decoy onto a steel plate 162. It may be desirable to apply brightly colored paint, tape, or the like to the driver so it is easy to spot on the ground. The driver 160 is then positioned so that the extension 164 of sleeve insert stock extends into the top of the ground sleeve 150 and the plate 162 rests on top of the top edge of the ground sleeve 150.

Figure 8:
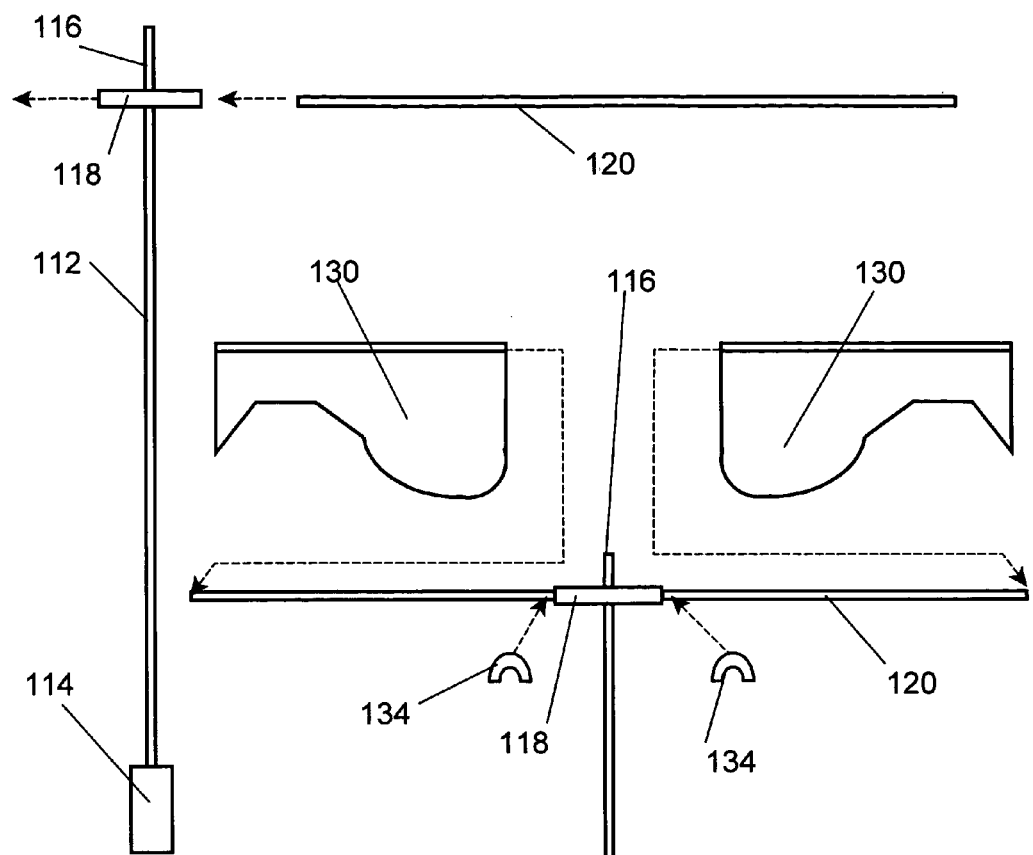

In assembling the rest of decoy 100, crossbar 120 is inserted through tubing sleeve 118 so that the crossbar is approximately centered with respect to the tubing sleeve and the upright member 110, as shown in FIG. 8. With the crossbar 120 positioned in tubing sleeve 118, one can slide the wings 130 onto the crossbar 118 from the outside ends toward the middle, as shown in FIG. 9. The wings are secured to the crossbar and/or the upright member, such as with clips 134 or hooks. As shown in FIG. 10, the body mounting extension 116 is then inserted into channel 142 on the bottom of the bird body 140, so the body 140 covers the tubing sleeve and the inside edges of the wings, and the back of the bird body is visible from above. Finally, as shown in FIG. 11, sleeve insert 114 is inserted into ground sleeve 150, with the bird body 140 and wings 130 facing into the wind. The fully assembled decoy 100 is shown in FIG. 12, with the hatched arrows indicating the direction of vertical motion of the crossbar 120 and the stippled arrows indicating the direction of wave motion within the wings 130 and along the crossbar 120.

To simulate a small flock of birds flying near the ground in search of food, it may be desirable to set up a group of several decoys. Because the birds do not fly in any particular formation while flying near the ground, the decoys may be positioned randomly with respect to each other and facing downwind. Alternatively, the decoys can be arrayed in a "V" or "W" formation used by flying flocks of birds.

The hunter then goes to the predetermined position downwind of the decoy or decoys, observes the desired birds as they approach the decoy or decoys, and then shoots, photographs, or does whatever activity is intended with the birds.

The manner in which the decoys in accordance with the present invention move and simulate birds in flight can be appreciated by observing the decoys in motion. A video tape, entitled, "Control Tower Decoys," shows the decoy motion and is available from www.groutdoors.com or Control Tower Decoys, 38256 WCR 19 FT Collins, Colo. 80524, United States, and the tape is incorporated herein by reference in its entirety. With the wing configuration shown in FIG. 4 and an upright member and a crossbar formed from 1018 cold finished steel as described above, the tip extension will move in breeze greater than about 3 mph. Even a gentle waving motion of the wing tip causes the end of the crossbar to dip, resulting in a wave in the fabric traveling toward the main part of the wing and the decoy body and back toward the tip extension. The spring action of the cross bar and the main portion of the wing trigger an additional whip-like up and down motion of the tip extension. The vertical motion of the ends of the crossbars wing is up to about 10 inches.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. A game bird decoy, comprising:
   an upright member comprising a rod, a body mounting extension at an end of said rod, and a tubing sleeve fixed to said rod adjacent said body mounting extension and substantially perpendicular to the long dimension of said rod;
   a crossbar approximately centered in said tubing sleeve of said upright member and approximately perpendicular to said upright member, said crossbar having a length selected to approximate the length of a game bird's wing span and an outer circumference small enough to provides play between said crossbar and said tubing sleeve;
   a pair of wings mounted onto and secured onto said crossbar, with one wing on either side of said upright member, and each wing having a shape selected such that said wing and crossbar can move with a fluttering motion that simulates the flapping of a game bird's wings during flight; and
   a bird body mountable onto said body mounting extension of said upright member; and
   means for positioning and retaining said upright member at a selected ground location with a selected orientation,
   wherein said wing shape is substantially similar to a shape having:
   a first edge extending about 34 inches along a straight line;
   a second edge extending substantially perpendicularly from one end of said first edge and terminating at a point A located about 15 inches from said first edge;
   a third edge extending substantially perpendicularly in the same direction as the second edge from the other end of said first edge and terminating at a point H located about 14 inches from said first edge; and
   a fourth edge extending between points H and A, wherein:
   a point G positioned between said second and third edges, about 8 inches from said first edge and about 29.5 inches from said second edge;

a point F positioned between said second and third edges, about 8 inches from said first edge and about 24 inches from said second edge;

a point D positioned between said second and third edges, about 12 inches from said first edge and about 18 inches from said second edge;

a point E positioned between said second and third edges, about 8 inches from said first edge and about 5.5 inches from said second edge and about 11 inches from point D;

a point C positioned between said second and third edges, about 4.5 inches from point A in a direction substantially perpendicular to said second edge;

a point B positioned about 20 inches from said first edge at the intersection of a first arc having a radius of about 4.5 inches centered at point C and a second arc having a radius of about 11 inches centered at point E; and said fourth edge extends along said first arc between points A and B, along said second arc between points B and D, along a substantially straight line between points D and F, along a substantially straight line between points F and G, and along a substantially straight line between points G and H.

2. The decoy of claim 1, wherein said means for positioning and retaining comprises a sleeve insert at a second end of said upright member and a ground sleeve having an inner opening, and wherein said inner opening of said ground sleeve and said ground sleeve insert on said upright member are shaped and sized such that when said ground sleeve insert is positioned within said ground sleeve, said decoy can be maintained in an orientation facing into a wind.

3. The decoy of claim 2, wherein said ground sleeve is adapted for insertion into the ground.

4. The decoy of claim 1, wherein each wing is formed from a material having sufficient flexibility to allow it to flap in the wind in a manner that simulates a bird's wing in flight and sufficient durability to withstand long-term use outdoors.

5. The decoy of claim 1, wherein each of said wings comprises a sleeve extending along one edge and into which one end of said crossbar is inserted.

6. The decoy of claim 1, wherein said bird body is sized, shaped, and marked to resemble the body of a predetermined species of bird when viewed from the top.

7. The decoy of claim 1, wherein said crossbar has spring-like properties sufficient to allow flexing and unflexing motions that simulate a bird's wing motion.

8. The decoy of claim 1, wherein said wing, said crossbar, and said upright member are adapted for motion that simulates flight of a game bird.

9. The decoy of claim 1, wherein said wing, said crossbar, and said upright member are adapted for motion that simulates flight of a game bird in winds with velocities greater than about 3 miles per hour.

10. The decoy of claim 1, wherein said rod of said upright member has a length sufficient to support said wings and said crossbar far enough above the ground to allow for life-like wing motion.

11. The decoy of claim 1, wherein said upright member has spring-like properties that allow said upright member to flex and unflex in the presence of wind.

12. The decoy of claim 1, wherein said game bird is selected from ducks and geese.

13. A kit for a game bird decoy, comprising:

an upright member comprising a rod, a body mounting extension at an end of said rod, and a tubing sleeve fixed to said rod adjacent said body mounting extension;

a flexible crossbar having a length selected to approximate the length of a game bird's wing span and a circumference that allows said crossbar to slide easily through said tubing sleeve with some play;

a pair of wings mounted onto said crossbar, with one wing on either side of said upright member, and each wing having a shape selected such that, when said kit is assembled, said wing and crossbar can move with a fluttering motion that simulates the flapping of the game bird's wings during flight;

means for attaching said wings to said crossbar, said upright member, or both;

a bird body adapted for mounting onto said body mounting extension of said upright member; and means for positioning and retaining said upright member at a selected ground location with a selected orientation, wherein said wing shape is substantially similar to a shape having:

a first edge extending about 34 inches along a straight line;

a second edge extending substantially perpendicularly from one end of said first edge and terminating at a point A located about 15 inches from said first edge;

a third edge extending substantially perpendicularly in the same direction as the second edge from the other end of said first edge and terminating at a point H located about 14 inches from said first edge; and a fourth edge extending between points H and A, wherein:

a point G positioned between said second and third edges, about 8 inches from said first edge and about 29.5 inches from said second edge;

a point F positioned between said second and third edges, about 8 inches from said first edge and about 24 inches from said second edge;

a point D positioned between said second and third edges, about 12 inches from said first edge and about 18 inches from said second edge;

a point E positioned between said second and third edges, about 8 inches from said first edge and about 5.5 inches from said second edge and about 11 inches from point D;

a point C positioned between said second and third edges, about 4.5 inches from point A in a direction substantially perpendicular to said second edge;

a point B positioned about 20 inches from said first edge at the intersection of a first arc having a radius of about 4.5 inches centered at point C and a second arc having a radius of about 11 inches centered at point E; and said fourth edge extends along said first arc between points A and B, along said second arc between points B and D, along a substantially straight line between points D and F, along a substantially straight line between points F and G, and along a substantially straight line between points G and H.

14. The kit of claim 13, wherein said means for positioning and retaining comprises a ground sleeve having inner opening and a sleeve insert at a second end of said rod, wherein said sleeve insert and said ground sleeve are sized and shaped such that said upright member can be maintained in a predetermined orientation when said ground sleeve is positioned at a desired location on the ground and said sleeve insert is inserted into said ground sleeve.

15. The decoy kit of claim 14, wherein said ground sleeve is adapted for insertion into the ground.

16. The decoy kit of claim 14, further comprising a driver for driving said ground sleeve into the ground, said driver comprising a driving insert shaped and sized to fit removably inside an end of said ground sleeve and a driving surface attached to said driving insert.

17. A wing assembly for a game bird decoy, said wing assembly comprising a wing formed from a sheet of flexible material shaped for substantially lifelike simulation of wing motion during flight and having a shape substantially similar to a shape comprising:
- a first edge extending about 34 inches along a straight line;
- a second edge extending substantially perpendicularly from one end of said first edge and terminating at a point A located about 15 inches from said first edge;
- a third edge extending substantially perpendicularly in the same direction as the second edge from the other end of said first edge and terminating at a point H located about 14 inches from said first edge;
- a fourth edge extending between points H and A, wherein:
- a point G has a position between said second and third edges, about 8 inches from said first edge and about 29.5 inches from said second edge;
- a point F has a position between said second and third edges, about 8 inches from said first edge and about 24 inches from said second edge;
- a point D has a position between said second and third edges, about 12 inches from said first edge and about 18 inches from said second edge;
- a point E has a position between said second and third edges, about 8 inches from said first edge and about 5.5 inches from said second edge and about 11 inches from point D;
- a point C has a position between said second and third edges, about 4.5 inches from point A in a direction substantially perpendicular to said second edge;
- a point B has a position about 20 inches from said first edge at the intersection of a first arc having a radius of about 4.5 inches centered at point C and a second arc having a radius of about 11 inches centered at point E; and
- said fourth edge extends along said first arc between points A and B, along said second arc between points B and D, along a substantially straight line between points D and F, along a substantially straight line between points F and G, and along a substantially straight line between points G and H.

18. The wing assembly of claim 17, wherein said game bird is selected from geese and ducks.

19. The wing assembly of claim 17, wherein said game bird is selected from Canada geese and snow geese.

20. The wing assembly of claim 17, wherein said wing has a shape substantially as shown in FIG. 4.

21. The wing assembly of claim 17, further comprising a crossbar onto which a pair of said wings are mounted.

22. The wing assembly of claim 17, wherein said wing has colors and markings resembling the colors and markings of a game bird's wings.

\* \* \* \* \*